April 21, 1942. G. E. FORD 2,280,393

OVEN THERMOMETER

Filed March 13, 1939

INVENTOR
GEORGE E. FORD
BY
ATTORNEY

Patented Apr. 21, 1942

2,280,393

UNITED STATES PATENT OFFICE 2,280,393

OVEN THERMOMETER

George E. Ford, Rochester, N. Y., assignor to Rochester Manufacturing Co. Incorporated, Rochester, N. Y., a corporation of New York Application March 13, 1939, Serial No. 261,523

7 Claims. (Cl. 73—367)

This invention relates to thermometers adapted for use on ovens, oven doors or the like having single or double walls to indicate the temperature within the oven on the outside thereof and the principal object of the invention is to provide a novel construction for such a thermometer in which the construction and arrangement of the elements assure a quick response of the thermoresponsive element to temperature changes in the oven and thereby provide an accurate indication thru the wall or walls of the condition of the oven at all times.

This and other objects and attendant advantages of the invention will become more clearly apparent from the detailed description thereof which follows, reference being had to the accompanying drawing in which Figure 1 is an enlarged front elevation of the thermometer with a portion of the casing broken away.

Figure 1:
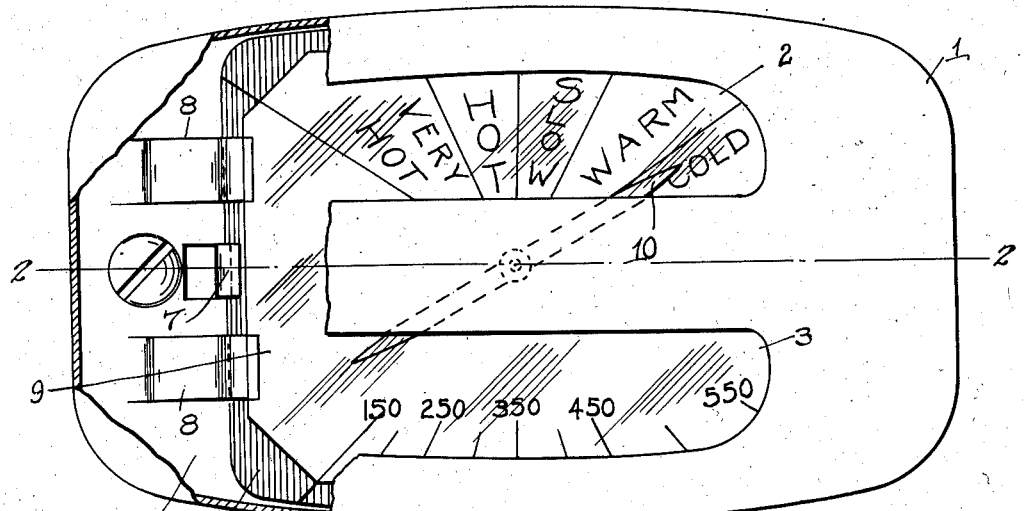

As illustrated in the figures of the drawing, the thermometer is housed in the case 1 which is provided at the front with the double windows 2 and 3, one above and the other below the middle of the front face of the case. The rear of the case 1 is closed by the supporting plate 4 which is held in place by suitable lugs 5, 5 formed in the wall of the case. A dial 6 is fastened to the inside of the supporting plate by the lugs 7, 7 which are struck in from the supporting plate to engage suitable notches in the sides of the dial and extend over the edges thereof. Other larger lugs 8, 8 are struck in from the supporting plate 4 to engage the edges of the sides of the glass cover 9 and exert pressure against the rear thereof to hold this glass cover within the case over the double windows 2 and 3 and thus protect the movement of the pointer or indicator 10 of the thermometer.

Fastened to the outside of the supporting plate so as to project rearwardly therefrom, is the U shaped spacing bracket 11. Lugs 12, 12 struck out from the supporting plate so as to pass thru suitable holes in the flanges 13, 13 of the bracket 11 are bent back against these flanges to firmly anchor the bracket 11 to the supporting plate. The bracket 11 spacedly supports the bearing member 14 in line with the bearing 15 in the center of the dial 6.

Centered on the outside of the bearing member 14 and clamped thereby to the bracket 11 is the shell 16 which houses the thermoresponsive element in the form of a bimetallic coil 17. The latter has its connecting ear 17A suitably anchored to the outer end of the indicator stem 18 which is journaled in the bearings 14 and 15 and carries in front of the dial the pointer or indicator 10.

The extension ear 17B of the thermoresponsive coil projects thru an opening 20 in the wall of the shell 16 and holds the coil in its properly adjusted position for the operation of the indicator stem and its indicator. The edge of the shell 16, which surrounds the open end thereof, carries a series of bendable lugs 21, 21 which are flared outwardly to provide yielding contact members.

The thermometer is mounted on the oven door so as to have the spacing bracket and members supported thereby project between the outer wall 22 and the inner wall 23 thereof. For this purpose the outer wall of the oven door is provided with an opening 24 with a suitable hole on each side thereof to have the anchoring bolts 25, carried by the supporting plate, clamp the case 1 to the outside of the door while the spacing bracket projects into the opening 24 between the outer and inner wall of the oven door. The length of the spacing bracket is such that it yieldingly holds the contact members 21, 21 of the shell 16 against the inside of the inner wall 23 of the door. In this way the shell which surrounds the thermo-responsive coil is held in contact with the wall of the door without being actually fastened thereto. Heat from this wall is thus quickly transmitted to the shell which causes the thermo-responsive coil within it to immediately respond to the heat radiation from the walls of the shell and from the portion of the oven door which faces the thermoresponsive coil thru the open end of the shell. The contact members 21 are, furthermore, so arranged and spaced at the edge of the shell that one of them is located directly over the extension ear 17B of the thermo-responsive coil in order to effect a quick and efficient transmission of heat from the wall to the extension ear. Suitable heat insulating material may be placed between the inner and outer wall of the oven door and around the shell 16 and its spacing and supporting bracket and heat insulate the outer wall from the inner wall without interfering with the accurate operation of the thermometer. The inner wall 23 may also be perforated so that by omitting heat insulation between the walls, heated air from the oven may freely enter from this wall and circulate around the shell 16 and the thermoresponsive member supported therein.

As illustrated in Figure 1, the double windows in the front of the case are spaced so as to expose equal areas of the dial above and below the middle of the case centrally thereof. In this way two vertically spaced complete dial sections are provided. The upper one of these sections carries indications giving the condition of the oven and the lower one the actual temperature in degrees Fahrenheit. The pointer or indicator 10, which is centrally journaled in the dial plate, is a double pointer and its upper end moves over the upper dial section and its lower end over the lower dial section to simultaneously indicate the condition of the oven and the actual temperature thereof on the two dial sections. The length of the double windows and correspondingly long dial areas permit the indications on the upper as well as on the lower dial section to be spaced for clear and accurate indications by the pointer ends.

Figures 2, 4:
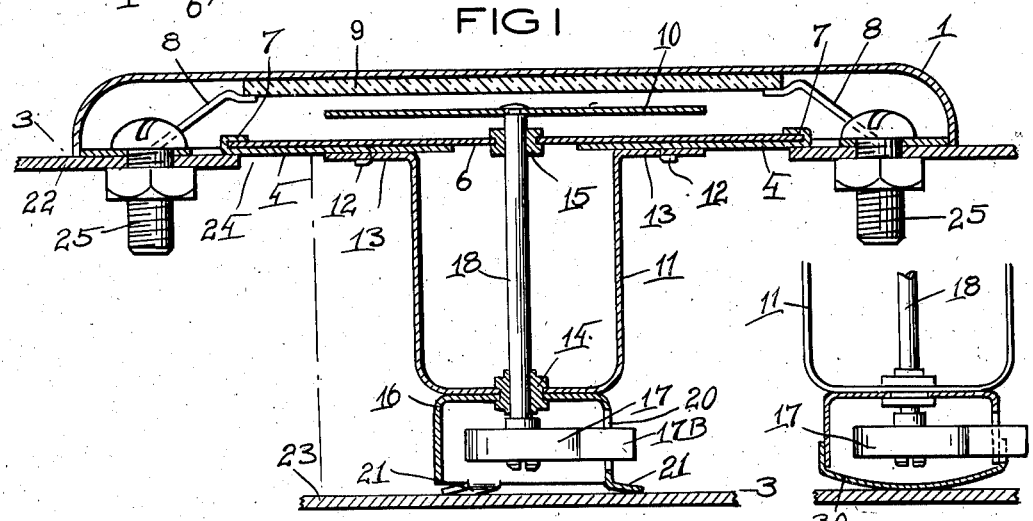
Figure 2 is a horizontal sectional view of the thermometer taken on the line 2—2 of Figure 1.
Figure 4 is a detail sectional view of a modified form of the supporting cup containing the thermoresponsive element.
Figure 3:
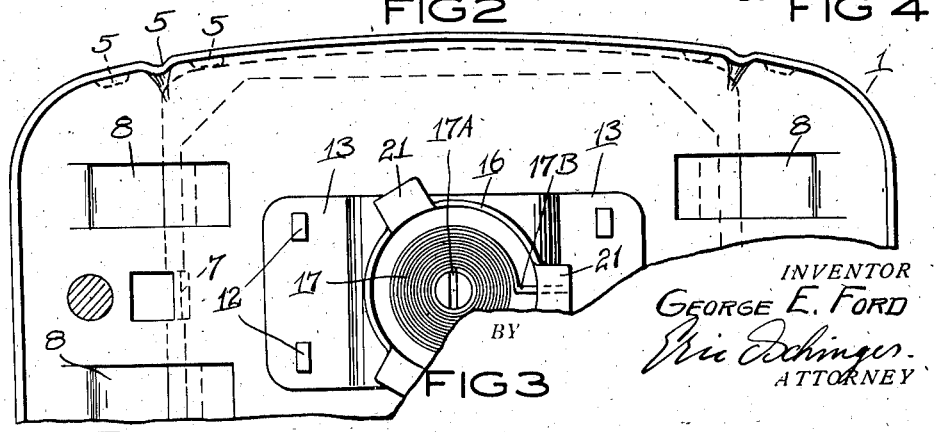
Figure 3 is a rear elevation of the thermometer taken on the line 3—3 of Figure 2.

In Figure 4 I have illustrated a modification of the supporting cup for the bi-metallic coil. In this modification the contacting lugs 21 are replaced by a cover 30 which is convexed so as to be yielding when forced into contact with the wall 23. This cover is telescoped over the open end of the supporting cup to close the cup and at the same time provide a yielding contact member as above pointed out.

I claim:

1. In a thermometer the combination of a case having an open back and a window in the front thereof, a supporting plate held between the walls of said case to close the open back thereof, a dial on said supporting plate, a transparent cover, lugs struck up from said supporting plate to extend above said dial plate on one side thereof and support said transparent cover under said window in front of and spaced from said dial, an indicator movable in front of said dial and thermoresponsive means for operating said indicator.

2. In a thermometer the combination of a case having an open back and a window in the front thereof, a supporting plate held between the walls of the case to close the open back thereof, a dial having a notch therein, a lug struck up from said supporting plate for engagement with the notch in said dial so as to locate and hold said dial on said supporting plate, a transparent cover under said window within said case, means provided on said supporting plate and extending above said dial for spacedly holding said transparent cover from said dial and yieldingly under said window and a thermal operated indicator mounted to move between said dial and said transparent cover within said case.

3. In a thermometer the combination of a case, a spacing bracket extending rearwardly of the case, a bearing in the outer end of said bracket, a dial within said case, a bearing in said dial, a pointer stem journaled in said bearings, an indicator carried by said stem in front of said dial, a thermoresponsive coil carried by said stem in back of said bracket, a shell supported by said bracket so as to surround said thermoresponsive coil, an ear on said thermoresponsive coil for contact with said shell and bendable contact members carried by said shell for conducting heat directly to and around said thermoresponsive member.

4. In a thermometer for operation by a heated wall member, the combination of a casing, a pointer stem journaled in said casing, a supporting member extending from said casing for the support of said pointer stem on the outside of said casing, a bi-metallic coil carried by said pointer stem and conductively connected with said supporting member, and yielding contact means carried on said supporting member on the outside thereof and radially spaced from said coil in close proximity to said heated wall for contact with the heated wall member and the conduction of heat from said heated wall member to said bi-metallic coil to supplement the unobstructed heat radiation from said wall member against said coil for the operation thereof.

5. In a thermometer for mounting on a wall having a spaced inner lining, the combination of a dial casing attachable to said wall, a bracket carried by said dial casing so as to extend between the wall and its lining, thermo-responsive means supported on said bracket and yielding means carried by said bracket to one side thereof and radially spaced from said thermoresponsive means in close proximity to said lining so as to contact said lining and to compensate for variable distances between the wall and its lining for the conduction of heat from the lining to the thermosponsive means to supplement the unobstructed heat radiation from said inner lining against said thermoresponsive means for the operation thereof.

6. In a thermometer for mounting on a wall having a spaced inner imperforate lining, the combination of a dial housing, a pointer movable in said dial housing, a cup shaped conduction casing at the back of said housing with its open end facing the imperforate lining, a bi-metallic operating coil mounted within said conduction casing, a pointer shaft connecting said coil with said pointer, and a lug carried by an edge portion surrounding the open end of said casing and flared outwardly from said edge portion to provide a yielding contact member for contact with said imperforate lining.

7. In a thermometer the combination of a case having a pointer stem rotatable therein, an open ended supporting cup spacedly mounted on said case and having an opening in the wall thereof, a bi-metallic coil in said supporting cup, a connecting ear centrally of said bi-metallic coil, an extension ear on the outside of said bi-metallic coil with said connecting ear fixedly supported on said pointer stem and said extension ear loosely supported in the opening of the wall of said supporting cup, and yielding contact members on the edge of said supporting cup, one of said members being in close proximity to said extension ear.

GEORGE E. FORD.